Nov. 17, 1953    T. A. RICH ET AL    2,659,864
ELECTROSTATIC INDUCTION VOLTAGE MEASURING DEVICE
Filed Feb. 11, 1949    2 Sheets-Sheet 2
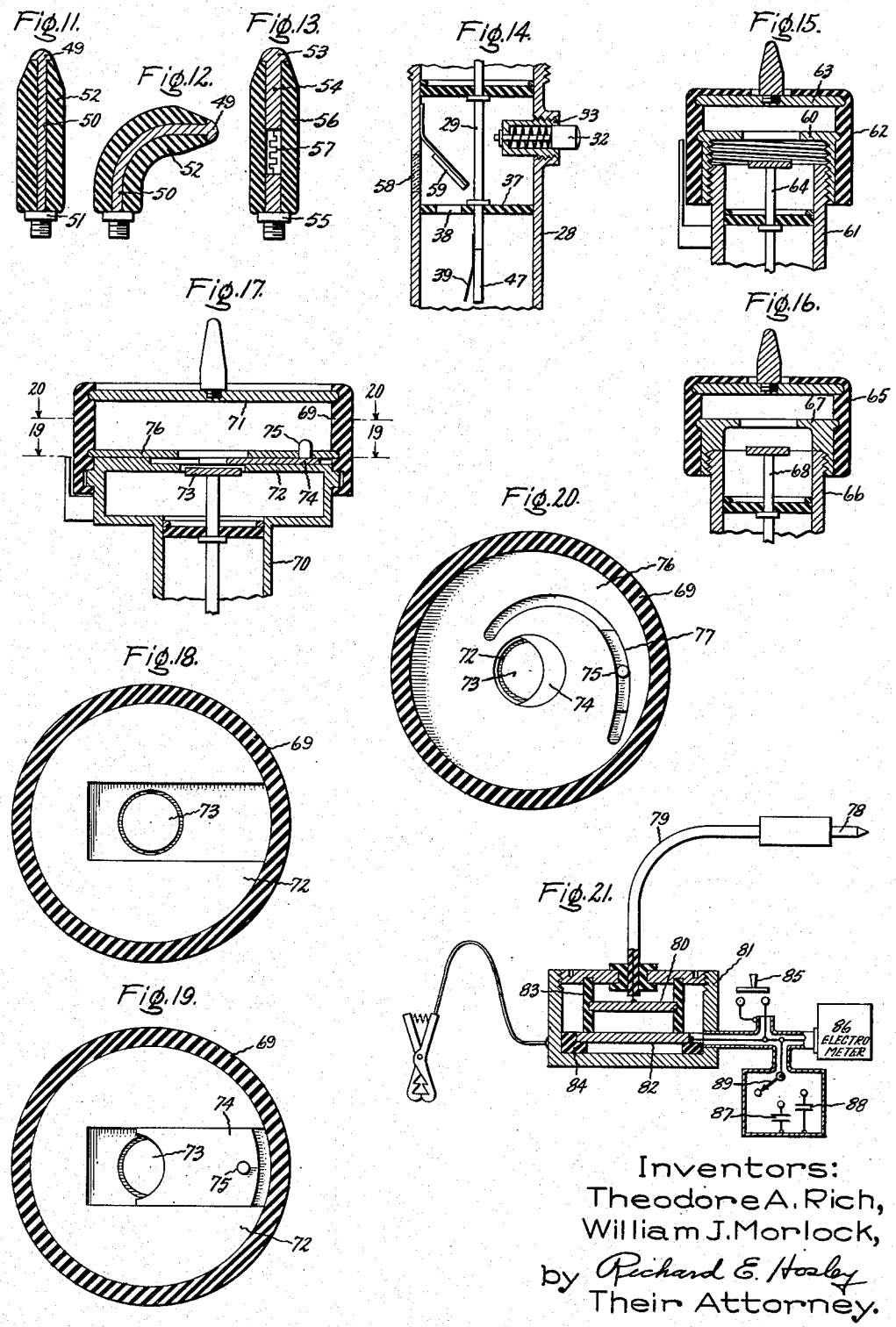
Inventors:
Theodore A. Rich,
William J. Morlock,
by Richard E. Hosley
Their Attorney.

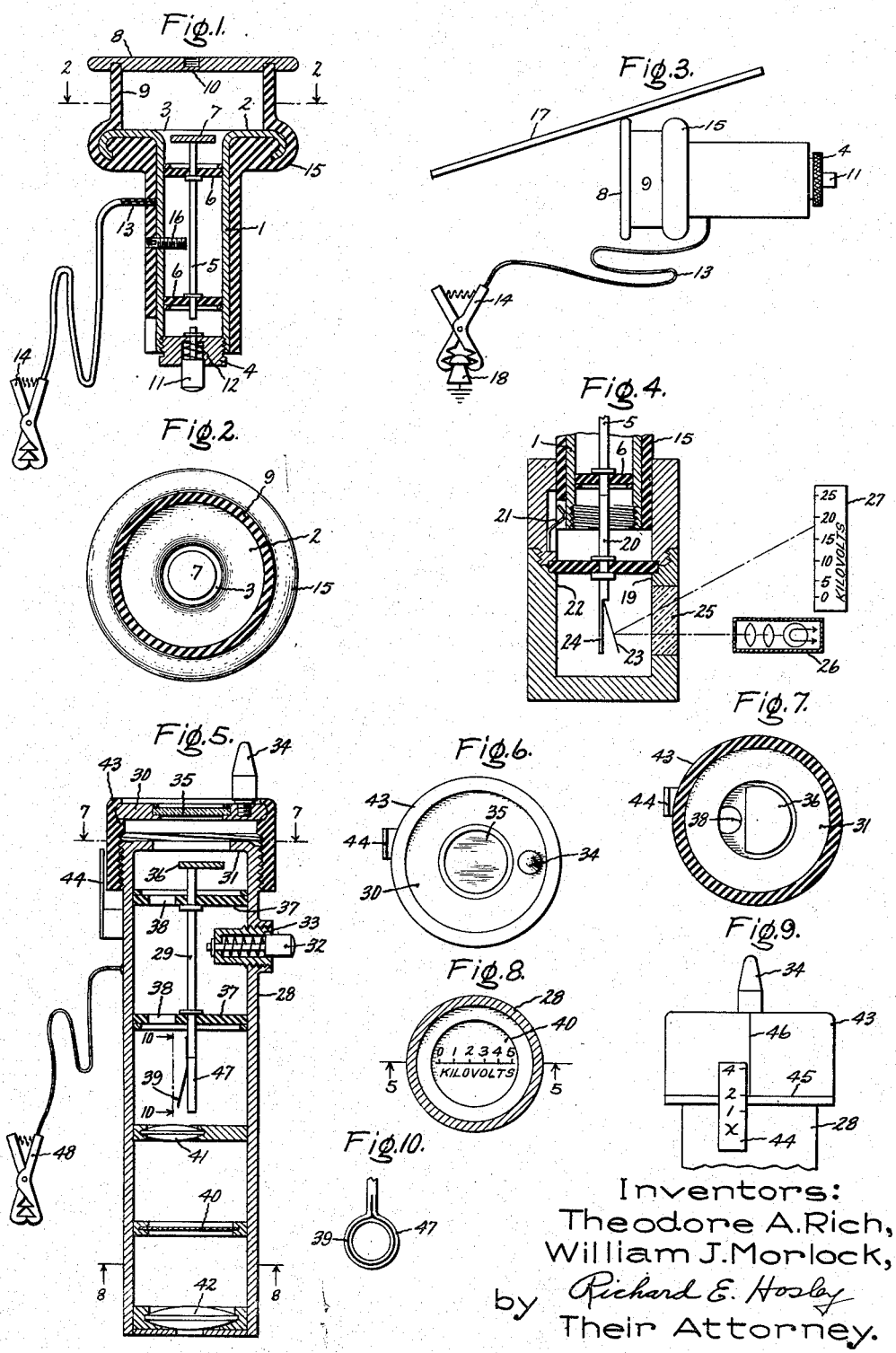

Patented Nov. 17, 1953

2,659,864

UNITED STATES PATENT OFFICE 2,659,864

ELECTROSTATIC INDUCTION VOLTAGE MEASURING DEVICE

Theodore Alfred Rich, Schenectady, and William J. Morlock, Syracuse, N. Y., assignors to General Electric Company, a corporation of New York Application February 11, 1949, Serial No. 75,926

20 Claims. (Cl. 324—109)

This invention relates to improvements in voltage measuring apparatus and in particular to an electrostatic induction device for measuring large direct voltages.

Serious difficulties appear when an attempt is made to adapt conventional voltmeters to measure large direct voltages in high impedance circuits. The problem is encountered, for example, in servicing television receivers where direct voltages in the order of 5 to 20 kilovolts may be encountered in circuits capable of supplying only very small amounts of power. The measurement of direct voltages of this magnitude with a conventional voltmeter requires that a resistance voltage divider be placed across the circuit. But in the case of high impedance circuits, any such divider having practical values of resistance uses an amount of power which is appreciably large relative to the power supplying capability of the circuit, and hence causes changes in the voltage which it is desired to measure. A conventional capacitance divider may be used to measure alternating voltages, but in the case of direct voltages this is impracticable because the ultimate division of direct voltage in a conventional capacitance divider is determined by the leakage resistance of the capacitors instead of by the capacitance ratio.

Voltage measuring apparatus previously used has other disadvantages. For use with high impedance circuits, resort has been had to vacuum tube voltmeters which are relatively bulky and expensive. When used with high voltage circuits, a substantial danger to the operator arises from the fact that the meter must be read at the same time that contact is made with the high voltage circuit, which requires that the operator divide his attention between two tasks. This greatly increases the danger of accidental contact between the operator's body and the high voltage circuit.

An object of this invention is to provide improved means to measure large direct voltages in high impedance circuits.

Another object is to provide such a device which can "remember" and indicate the measured voltage after removal from contact with the high voltage circuit, thus lessening danger to the operator.

Another object is to provide such a device which is small, convenient to use, and economical to manufacture.

Other objects and advantages will appear as the description proceeds.

The features of the invention which are believed to be novel and patentable are pointed out in the claims forming a part of this specification. For a better understanding of the invention, reference is made in the following description to the accompanying drawings, in which Fig. 1 is a section taken in a plane through the axis of one embodiment of the invention; Fig. 2 is a section along line 2—2, Fig. 1; Fig. 3 is a schematic diagram illustrating use of the device shown in Figs. 1 and 2; Fig. 4 is a section of an electrometer used with the induction device to indicate voltage; Fig. 5 is a section in a plane through the axis of a second embodiment of the invention; Fig. 6 is a top view of the embodiment shown in Fig. 5; Fig. 7 is a section along the line 7—7, Fig. 5; Fig. 8 is a section along the line 8—8, Fig. 5; Fig. 9 is a partial side view of the device shown in Fig. 5; Fig. 10 is a partial view along the line 10—10, Fig. 5; Figs. 11, 12, and 13 are sections of alternate probes; Fig. 14 is a section of an alternate construction for admitting light in the device shown in Fig. 6; Figs. 15, 16 and 17 are sections of alternate heads for the device; Fig. 18 is a section along the line 19—19, Fig. 17, with the masking member 14 removed; Fig. 19 is the same section with the masking member in place; Fig. 20 is a section along the line 20—20, Fig. 17; and Fig. 21 is a schematic view, partly in section, of another embodiment of the invention. Where the same part appears in more than one figure of the drawing, it is represented in each case by the same reference number.

Referring now to Figs. 1 and 2, a conductive outer member or tube 1 has a flange 2 about an opening 3 at one of its ends. A removable plug 4 closes the other end of the tube. The tube and the plug may be made of metal and may be provided with mating threads, as shown, so that the plug can be easily removed and replaced.

A conductive inner member or rod 5 extends lengthwise along the axis of tube 1 and is supported in this position and insulated from the tube by insulating beads 6. At its end nearest the opening at the flanged end of tube 1, rod 5 preferably has an enlarged diameter which may form a plate-like surface 7 facing outward through the opening.

A third conductive member or plate 8, a metal plate for example, is larger than and faces the opening at the flanged end of the tube. Plate 8 is held in position relative to the tube by a ring 9 of insulating material, so that the plate is insulated from both the tube and the rod. A threaded hole 10 may be provided in the plate for the attachment of probes, as hereinafter described in connection with Fig. 6.

Built into plug 4, as shown, is a push-button switch 11. When the button is pressed to close switch 11, rod 5 is electrically connected to tube 1. Spring 12 opens the switch and breaks the connection when the pressure is released.

A lead 13, which may terminate in an alligator clip 14, is attached to tube 1 as shown. Protective insulation 15 may be provided about the tube to reduce the danger of accidental shorts across the high voltage to be measured. A screw 16 may be provided which extends through the side of tube 1 toward rod 3. This provides a convenient means for adjusting the capacitance between the tube and the rod for calibration purposes, as hereinafter explained.

Refer now to Fig. 3, which schematically illustrates use of the device. Suppose that a high direct voltage exists between a wire 17 and ground terminal 18, which may be respective parts of a high-voltage, high-impedance electric circuit, and that it is desired to measure this voltage. Clip 14 is attached to the ground terminal, as shown, and then plate 8 is brought into contact with wire 17. While plate 8 is in contact with the wire, push-button switch 11 is pressed momentarily and then released. Plate 8 is now removed from the wire and touched against clip 14, or any other convenient ground point, to discharge the high potential to which the plate was charged by contact with the high voltage wire. The device may then be removed and the voltage read at the operator's convenience, hours later if so desired, as hereinafter explained.

To understand the operation of the device, assume that clip 14 is connected to ground and that plate 8 is in contact with a conductor at a high potential, 20,00 volts for example. When push-button switch 11 is closed, rod 5 is connected to tube 1, which in turn is connected to ground through lead 13, so that both tube 1 and rod 5 are at ground potential. But plate 8, in contact with the high voltage conductor, is at a potential of 20,000 volts; and as a result there is a strong electric field between plate 8 and surface 7 at the top of rod 5. Electrostatic induction of this field causes the accumulation of an electric charge on the lower surface of plate 8, and an opposite charge on upper surface 7 of rod 5. The amounts of these charges can be computed if the capacitances involved are known. Assuming a potential difference of 20 kv. and a capacitance between rod 5 and plate 8 of .05 micromicrofarads, the charge accumulated on rod 5 is 20,000×1000 micromicrocoulombs.

When switch 11 is opened, everything remains the same until plate 8 is removed from contact with the high voltage conductor and is brought into contact with clip 14, or some other ground connection. Then the charge on plate 8 escapes and plate 8 assumes ground potential. When this happens, the charge which remains trapped on rod 5 produces a voltage between the rod and tube 1. The value of this voltage is determined by the amount of the charge and by the combined capacitance from rod 5 to tube 1 and to plate 8. If the combined capacitance is 10 micromicrofarads, and the charge is 1000 micromicrocoulombs as previously computed, then the voltage between rod 5 and tube 1 is $$\frac{1000}{10} = 100 \text{ volts}$$

This voltage is of a very convenient magnitude to measure, in contrast to the dangerous and hard-to-measure 20,000 volts in the high voltage circuit.

Screw 16 provides means for making small changes in the capacitance between tube 1 and rod 5, and thus provides a means for calibrating the device. When screw 16 is moved closer to the rod, the capacitance between tube and rod is increased, and the voltage between rod and tube corresponding to a given measured voltage is reduced. The converse is true when screw 16 is moved farther away from rod 5. After calibration, a seal may be placed over the head of the screw to hold it in position.

An electrometer or electrostatic voltmeter provides a good means for measuring voltage between rod 5 and tube 1. A simple form of such an electrometer is shown schematically in Fig. 4. Plug 4 is removed from the induction device and the bottom of tube 1 is inserted in well 19 of the electrometer. In the well is a button 20 which makes contact with rod 5, as shown, and a spring 21 which insures good contact between tube 1 and wall 22 of the electrometer.

Connected to button 20 is the electrometer moving element 23, and a stationary plate 24. Element 23 may, for example, be a leaf of metal foil, such as gold leaf, or metal plated quartz fibre. Element 23 swings away from stationary plate 24 by an amount which depends upon the voltage between button 20 and the wall of the electrometer. An indication of the voltage is obtained by observing the position of element 23 through window 25. A light source 26 may be provided to supply a small beam of light, represented by a broken line on the drawing, which is reflected by element 23 to scale 27, which may be calibrated in terms of the high voltage measured by the device.

For greater accuracy, more complicated electrometers known in the art may be employed, such as those adapted for use with pencil-type radiation dosimeters.

The range of voltages which may be measured by the device depends upon the ratio of the capacitance between rod 5 and plate 8 and the combined capacitance between rod 5 and tube 1 and plate 8. Therefore, the range of the instrument may be changed by changing either the capacitance between the rod and the plate, or the capacitance between the rod and the tube. Screw 16 provides one means for making small changes in the capacitance ratio. Other ways of changing the ratio include changing the distance between plate 8 and rod 5, changing the area of either plate 8 or the top surface 7 of the rod, using a different dielectric material between the plate and the rod or between the rod and the tube—for example a material having a dielectric constant substantially different from that of air could be inserted in the space between plate 8 and rod 5, adding a capacitor between the rod and the tube, moving the rod in or out relative to the opening at the flanged end of the tube, and partially shielding the rod from the plate by placing a masking member over part of the opening.

Different ranges of voltages can be covered by making separate devices for each range; or by making a single device having interchangeable heads, or an adjustable head, to provide different capacitance ratios. Several interchangeable or adjustable heads are described in Figs. 5, 15, 16, and 17–20. With a number of devices or interchangeable heads respectively covering a series of voltage ranges, it is possible to measure voltages from a few volts to many kilovolts.

It has been noted that the inner member or rod 5 is capacitively linked to outer member or tube 1 and to plate 8. It is important that the inner member be shielded from other capacitive linkages. For example, suppose that when plate 8 is in contact with wire 17 and push-button switch 11 is closed, there should be capacitive linkage between some other part of the high voltage circuit and rod 5. Such a linkage would produce a charge on rod 5 additional to the charge produced by the linkage between the rod and plate 8, and the additional charge would cause an error in the voltage indicated. To prevent undesirable linkages, the outer member and the conductive plate are arranged so that together they substantially surround the inner member. By providing a flange about the opening in tube 1 and by having plate 8 facing and larger than the opening, undesirable linkages with rod 5 are substantially eliminated.

Refer now to Figs. 5 and 6, which show an embodiment of the invention having the complete instrument comprising the induction device and the electrometer incorporated in a single structure. A conductive tube 28, an inner member or rod 29, and a conductive plate 30 perform the same functions as corresponding parts of the induction device previously described. Inwardly extending flange 31 supplies shielding action in the same manner as the outwardly extending flange of the embodiment shown in Fig. 2. The inwardly extending flange construction makes for a larger tube, which provides more space for the electrometer.

Push-button switch 32, when closed, connects rod 29 and tube 28. The housing 33 of the switch may be constructed so that it can be screwed into the tube by an adjustable amount to adjust the capacitance between the rod and the tube for calibration purposes. This adjustment may be made immediately after manufacture, and housing 33 may then be sealed in position with a bit of solder. Calibration of the device is unlikely to change in use, unless it is subjected to such rough handling that bending of the parts occurs.

A conductive probe 34 may be attached to plate 30, as shown. In many cases, a probe makes it much easier to establish electrical contact between the plate and a desired part of the high voltage circuit. The probe may be removable so that other probes may be substituted, or the device may be used without a probe by simply touching the plate itself to the high voltage circuit. The addition of the probe does not affect the calibration of the instrument, since the conductive plate shields the probe from any appreciable capacitive coupling with the inner member.

In this embodiment, light must be admitted to illuminate the electrometer. This may be done by providing a transparent window 35 in the center of plate 30. Preferably, such a window is made of electrically conductive plastic material, so that the presence of the window does not diminish the electrostatic shielding effect of the plate. The enlarged end 36 of rod 29 has a cut-away segment, and each of the insulating beads 37 is provided with a hole 38 to permit the passage of light from the window to the electrometer. The shape of enlarged end 36 of the rod is best illustrated in Fig. 7.

Referring again to Fig. 5, attached to rod 29 is an electrometer movable element 39. The position of this element indicates the voltage between rod 29 and tube 28, and hence the voltage measured by the instrument. Element 39 is illuminated by light from window 35. An image of a portion of element 39 is formed on a scale 40 by lens 41. Scale 40 may be a sheet of transparent material on which suitable voltage units are printed. The scale is best shown in Fig. 8. The scale and image are viewed simultaneously through an eyepiece including lens 42.

The head of the instrument may be made adjustable so that several ranges of voltage can be measured. Plate 30 is attached to the top of an insulating cap 43, which is threaded to mate with other threads on the flanged end of tube 28, so that the cap screws on the open end of the tube. With this threaded engagement of the parts, the distance, and hence the capacitance, between plate 30 and rod 29 can be changed by turning cap 43 relative to tube 28. A scale 44 may be provided at the side of the tube to indicate the position of the cap. This is best shown in Fig. 9. The scale may be on a separate member as shown, or may be inscribed on the side of tube 28. Scale 44 may be marked with suitable multiplying factors by which scale 40 should be multiplied to indicate the voltage measured. A reference line 45 may be inscribed around the cap as shown, or the bottom of the cap may be used as a reference. Vertical lines 46 may also be inscribed on the cap to facilitate accurate setting.

As an example of how this works, suppose that a voltage of 8000 volts is to be measured. Cap 43 may be turned until reference line 45 is aligned with the mark numbered 2 on scale 44. When the measurement is made, if the instrument is accurately calibrated, the image of a portion of electrometer element 39 will be formed at the mark labelled 4 kilovolts on scale 40. Multiplying 4 kilovolts by the multiplying factor 2 gives the correct value of 8 kilovolts. Suppose that the same measurement is made with line 45 aligned with the mark on scale 44 numbered 4. Plate 30 is now separated from rod 29 by a greater distance, such that the capacitance between the plate and the rod is approximately half as much as before. Therefore, only half as much charge is induced on rod 29 when the measurement is made. The image on scale 40 appears on the mark labelled 2 kilovolts. Multiplying 2 kilovolts by the multiplying factor 4 again gives the correct answer of 8 kilovolts.

The electrometer element may be constructed in a number of ways. A preferred form is illustrated in Fig. 10, which is a view taken at right angles to that of Fig. 5. In this form, moving element 39 is a thin quartz fiber or other conductive fibre, and stationary element 47 is a loop of stiff wire. The upper end of the quartz fiber is attached to the wire, but the lower end is free to swing outward in response to electrostatic forces. When a voltage exists between rod 29 and tube 28, the electrostatic forces pull the lower end of the quartz fiber toward the adjacent wall of the tube. The stationary loop 47, being at the same potential as the fiber, shields it from electrostatic forces which would tend to pull the fiber in the opposite direction. The distance which the lower end of fiber 39 swings away from stationary loop 47 is a function of the voltage between rod 29 and tube 28. The image formed on screen 40 by lens 41 is that of a small portion at the bottom of fibre 39.

This embodiment of the invention is very handy to use, since it can be made about the size of a large fountain pen, suitable to be carried about in the pocket. To measure a voltage, clip 48 is attached to ground and probe 34 is brought into contact with the high voltage circuit. Pushbutton switch 32 is pressed momentarily, and released. Probe 34 is then touched to clip 48, and the reading is made by pointing the head of the instrument towards the light and observing scale 40 and the image thereon through lens 42. To make reading easy, the optical system is arranged so that the movement of the image is greater than the movement of electrometer element 39, and so that both the image and the scale are magnified by lens 42.

For certain measurements, it may be convenient to have special probes. Fig. 11 shows a probe which may be made rather long to reach relatively inaccessible places. Tip 49 of the probe is connected by conductive shaft 50 to the base 51, which is threaded to screw into the threaded hole 10 in plate 8, Fig. 1, or in plate 30, Fig. 5. Shaft 50 may be covered with a heavy sheath of insulation 52 to reduce the possibility of the probe shortcircuiting parts of the high voltage circuit through accidental contacts.

Fig. 12 shows a probe similar to the one shown in Fig. 11, except that the probe shown in Fig. 12 is curved to reach into places not readily accessible with a straight probe.

If the circuit in which direct voltage is to be measured also has a substantially large component of alternating voltage, an erroneous reading may be obtained, since the reading will depend somewhat upon the phase position of the alternating voltage cycle during which switch 32 is closed and opened. This difficulty may be reduced by using a probe of the type shown in Fig. 13. This probe comprises a tip 53, a conductive shaft 54, a base 55, threaded to screw into the conductive plate of the induction device and an insulating sheath 56 similar to those in the probes previously described. Between the tip and the base is a resistor 57, which preferably has a resistance value in the order of several megohms. When this probe is used, switch 32 is held closed for a longer interval than would otherwise be necessary, so that the capacitance between the conductive plate and the inner member has ample opportunity to charge up to the full D.-C. voltage measured. As to the A.-C. voltage, the instrument will act as a voltage divider with a substantial part of the A.-C. voltage drop occurring across resistor 57. This greatly reduces the undesired effects of the A.-C. voltage.

A probe of the type shown in Fig. 13 may also be useful even when no alternating voltages are present; for example, when the circuit in which voltage is to be measured is highly inductive, so that the capacitance of the measuring device could cause undesirable transients when suddenly placed across the circuit.

Refer now to Fig. 14, which shows an alternate construction for admitting light to illuminate the electrometer. This construction eliminates the necessity for a window in the conductive plate. Instead, a window 58 is provided in the side of the conductive tube, and light admitted through this window is reflected to the electrometer by a small mirror 59. Preferably, window 58 is made of conductive plastic to provide a shield against undesired capacitive linkages with the inner member.

Refer now to Fig. 15, which shows an alternate adjustable head. In this head, flange 60 is not a part of conductive tube 61, but instead is mechanically connected to insulating cap 62 and turns with the cap. However, the threaded connection between the cap and the tube is of metal, so that the flange is electrically connected to the tube and thus is always at ground potential. Conductive plate 63 is attached to the top of the cap, and is insulated from flange 60, tube 61, and inner member 64. When the cap is turned, the distance between flange 60 and inner member 64 is changed, which changes the capacitance between the inner member and plate 63. Since the electric field produced by the high potential of the plate decreases rapidly in strength with increased distance below the opening, very large changes in capacitance between plate 63 and rod 64 are possible with this type head. Protective insulation may extend over the top of plate 63, as shown, so that only the probe can contact the high voltage circuit. This reduces the danger of accidental shorts.

Fig. 16 shows a similar head of non-adjustable type. Cap 65 is screwed all the way down on tube 66, so that flange 67 is a fixed distance from inner member 68, depending upon the dimensions of the cap. Different voltage ranges are obtained by providing caps having different dimensions, one for each voltage range to be covered, and interchanging the caps when it is desired to change ranges.

Refer now to Figs. 17 to 20, which show another adjustable head. In this head cap 69 may be turned relative to conductive tube 70, but it does not move axially. Hence there is no change in spacing between plate 71, flange 72, and inner member 73. A change in capacitance is obtained by interposing a masking member 74 by an adjustable amount between plate 71 and the inner member. Masking member 74 is made of a conductive material such as metal, and slides within a groove in flange 72 with which it is in electrical contact. Masking member 72 thus covers a greater or lesser portion of the opening at the flanged end of tube 70 depending upon its position. Attached to the masking member is a pin 75 which engages a spiral groove cut into a disk 76, which is attached to and turns with cap 69. As the cap is turned, disk 76 moves relative to flange 72 and mask 74, and thus forces the mask outward or inward over the opening by the action of spiral groove 77 on pin 75.

Refer now to Fig. 21, which shows another embodiment of the invention useful for measuring low and moderately high voltages. Probe 78 is attached to a lead 79, so that other parts of the apparatus do not have to be brought near the high voltage circuit. The disadvantage of this form is that when the voltages to be encountered become high, the amount of insulation required for safety makes lead 79 bulky. A first conductive member or plate 80 performs the same function as conductive plates in the other embodiments described, while a conductive box 81 acts as the conductive tube. Box 81 completely surrounds the other parts of the induction device, so that very good shielding from undesired capacitive linkages is obtained. The second or inner conductive member may be a plate 82 positioned between plate 80 and the inner surface of the box. Insulating rings 83 and 84 support the various parts in proper relative position. Push-button switch 85 when closed connects inner member 82 to box 81, and electrometer 86 responds to voltage between these two parts when the switch is open. Various ranges are provided by selectively connecting capacitors 87 and 88 between inner member 82 and box 81 by means of selector switch 89.

Numerous other variations in design are possible, as will be apparent to those skilled in the art. For example, the inner conductive member could be in two parts electrically connected together. One such part would be capacitively linked to the conductive plate, while the other part would be capacitively linked to the outer member or tube. The capacitive linkages could be provided or augmented by high-quality capacitors having very high values of leakage resistance.

Having described the principle of this invention and the best mode in which we have contemplated applying that principle, we wish to be understood that the apparatus described is illustrative only, and that other means can be employed without departing from the true scope of the invention defined by the following claims.

What we claim as new and desire to secure by Letters Patent of the United States is:

1. A portable electrostatic induction device including three conductive members insulated from one another and so arranged that a first of said members is surrounded on all sides by the other two of said members and thereby is linked capacitively with each of the other members and is substantially shielded from other capacitive linkages, connections for connecting the latter two members to respective parts of an electric circuit or to each other selectively, and a switch mounted on one of said latter two members and having a movable conductive element designed to contact said first member which when closed connects the first member and said one of the other two members.

2. A portable electrostatic induction device comprising a conductive plate member, an outer conductive member having an insulated outer surface, and an inner conductive member all insulated from one another, said plate member and outer member together substantially surrounding said inner member on all sides so that the inner member is capacitively linked with each and is shielded from other capacitive linkages, and a switch mounted on said outer member and having a movable conductive element designed to contact said inner member which when closed connects said inner and outer members.

3. A portable electrostatic induction voltage measuring apparatus comprising three conductive members insulated from one another and so arranged that a first of said members is surrounded on all sides by the other two of said members and thereby is linked capacitively with each of the other two and is substantially shielded from other capacitive linkages, connections for connecting the latter two members to respective parts of an electric circuit or to each other selectively, a switch mounted on one of said latter two members and having a movable conductive element designed to contact said first member which when closed connects the first member to one of the other two members, and means responsive to voltage existing between the two members that are connectable by said switch.

4. A portable electrostatic induction voltage measuring apparatus comprising a conductive plate, an outer conductive member, and an inner conductive member all insulated from one another, said plate and outer member together substantially surrounding said inner member on all sides so that the inner member is capacitively linked with each and is shielded from other capacitive linkages, a switch mounted on said outer member and having a movable conductive element designed to contact said inner member which when closed connects said inner and outer members, and an electrometer responsive to voltage between said inner and outer members.

5. A portable electrostatic induction device comprising a conductive tube open at one end only, a conductive plate facing the open end of said tube and disposed adjacent the same, and an inner conductive member within said tube all insulated from one another, and a switch mounted on said outer member and having a movable conductive element designed to contact said inner member which when closed connects said inner member and said tube.

6. A portable electrostatic induction device comprising a conductive tube having a flange about an opening at one of its ends, a conductive member closing the other end of said tube, a conductive rod having an enlarged diameter at one of its ends, means to support said rod entirely within and insulated from said tube with the enlarged end of the rod nearest the opening at the flanged end of the tube, a conductive plate larger than and facing the opening at the flanged end of the tube, means to hold said plate in position relative to said tube and insulated from both the tube and the rod, and a switch mounted on said conductive tube and having a movable conductive element designed to contact said rod which when closed connects said rod and said tube.

7. A portable electrostatic induction device comprising a conductive tube having an insulated outer surface, a conductive plate facing an open end of said tube and insulated therefrom, a removable plug to close the other end of the tube, a conductive rod positioned lengthwise within said tube and insulated from both the tube and the plate, and a switch mounted on said conductive tube and having a movable conductive element designed to contact said rod which when closed connects said rod and said tube.

8. A portable electrostatic induction device comprising a conductive tube having a flange about an opening at one of its ends and an insulated outer surface, a removable plug to close the other end of the tube, a conductive rod having an enlarged diameter at one of its ends, means to support said rod within and insulated from said tube with the rod extending lengthwise and having its enlarged end nearest the opening at the flanged end of the tube, a conductive plate larger than and facing the opening at the flanged end of the tube, means to hold said plate in position relative to said tube and insulated from both the tube and the rod, and a push-button switch mounted on said conductive tube and having a movable conductive element designed to contact said rod built into said plug which when closed connects said rod and said tube.

9. A portable electrostatic induction device comprising a conductive tube, a conductive plate facing an open end of said tube, and a conductive rod within said tube all insulated from one another, a switch mounted on said conductive tube and having a movable conductive element designed to contact said rod which when closed connects said rod and said tube, and a screw extending through the side of the tube towards the rod for adjusting the capacitance between the rod and the tube.

10. An electrostatic induction voltage measuring device comprising a conductive tube substantially closed at one end, a conductive plate disposed adjacent the open end of said tube and capacitively linked thereto, and an inner conductive member within said tube all insulated from one another, a switch which when closed connects said inner member and said tube, and an electrostatic voltmeter built into the lower end of said tube and responsive to voltage between the inner conductive member and the tube.

11. An electrostatic induction voltage measuring device comprising a conductive tube, a conductive plate disposed adjacent an open end of said tube and capacitively linked thereto, and an inner conductive member wholly within said tube all insulated from one another, a switch which when closed connects said inner member and said tube, an electrostatic voltmeter movable element positioned wholly within said tube and connected to said inner member, and an optical system and scale for observing the position of said movable element.

12. An electrostatic induction voltage measuring device comprising a conductive tube having a flange about an opening at one of its ends, a conductive rod having an enlarged diameter at one of its ends, means to support said rod wholly within and insulated from said tube with the enlarged end of the rod nearest the opening at the flanged end of the tube, a conductive plate larger than and facing the opening at the flanged end of the tube, means to hold said plate in position relative to said tube and insulated from both the tube and the rod, a switch which when closed connects said rod and said tube, a conductive fibre attached to said rod to form the movable element of an electrostatic voltmeter responsive to voltage between the rod and the tube, means to admit light into the tube to illuminate said fibre, a scale, and an optical lens system to image a portion of the fibre on the scale and to provide means for viewing the image and the scale.

13. A portable electrostatic induction device comprising a conductive plate, an outer conductive member, and an inner conductive member all insulated from one another, said plate and outer member together substantially surrounding said inner member on all sides so that the inner member is capacitively linked with each and is shielded from other capacitive linkages, a switch mounted on said outer member and having a movable conductive element designed to contact said inner member which when closed connects said inner and outer members, and a conductive probe connectable to said plate.

14. A device as in claim 13 in which the probe includes a tip, a base connectable to the conductive plate, and a resistor between said tip and said base.

15. The combination in an electrostatic induction device of a conductive tube, an inner conductive member within said tube and insulated therefrom, a switch which when closed connects said inner member and said tube, a cap which screws on an open end of said tube, and a conductive plate attached to the top of said cap and insulated from both the tube and the inner member, so that the distance and the capacitance between said plate and said inner member are varied by turning the cap relative to the tube.

16. An electrostatic induction device comprising a conductive tube having a flange about an opening at one of its ends, a conductive rod having an enlarged diameter at one of its ends, means to support said rod within and insulated from said tube with the enlarged end of the rod nearest the opening at the flanged end of the tube, a switch which when closed connects said rod and said tube, a cap which screws on the flanged end of the tube, and a conductive plate attached to the top of said cap and insulated from both the tube and the rod, so that the distance and the capacitance between said plate and said rod are varied by turning the cap relative to the tube.

17. A portable electrostatic induction device comprising a conductive tube, an inner conductive member within said tube and insulated therefrom, a switch mounted on said conductive tube and having a movable conductive element designed to selectively contact said inner member which when closed connects said rod and said tube, a cap which screws on an open end of said tube, a conductive plate attached to the top of said cap and insulated from both the tube and the inner member, and a conductive flange within said cap between said plate and said tube, said flange being mechanically connected to turn with the cap and electrically connected to the tube, so that the distance between the inner member and the flange and the capacitance between the inner member and the plate are varied by turning the cap relative to the tube.

18. A portable electrostatic induction device comprising a conductive tube, a conductive inner member within said tube and insulated therefrom, a switch mounted on said conductive tube and having a movable conductive element designed to selectively contact said inner member which when closed connects said inner member and said tube, a conductive plate facing an open end of said tube and insulated from both the tube and the inner member, a masking member, and means to interpose said masking member between said plate and said inner member by an adjustable amount.

19. A portable electrostatic induction voltage measuring device comprising a conductive box, a first conductive member wholly within the box and insulated therefrom, a second conductive member between said first member and a side of the box and insulated from both, a lead connected to said first member and extending outside the box, a probe connected to said lead, a switch mounted on said box and having a movable conductive element designed to selectively contact said second conductive member which when closed connects said second member and said box, and means responsive to voltage between said second member and said box.

20. An electrostatic induction device comprising an electrically conductive outer hollow member having a flanged end portion, an electrically conductive inner member supported within said outer hollow member and electrically insulated therefrom, an electrically conductive plate member insulatingly spaced from and parallel to the flanged end portion of said outer member, said inner member being capacitively linked with said outer member and said plate and shielded from other capacitive linkages, and a switch supported on said outer hollow member and having a movable conductive element designed to contact said inner member for selectively connecting said inner member to said outer hollow member.

THEODORE ALFRED RICH.
WILLIAM J. MORLOCK.

References Cited in the file of this patent

UNITED STATES PATENTS

| Number | Name | Date |
|---|---|---|
| 999,800 | Kintner | Aug. 8, 1911 |
| 1,809,285 | Peters | June 9, 1931 |
| 2,022,117 | Lauritsen | Nov. 26, 1935 |
| 2,178,954 | Dehmel | Nov. 7, 1939 |
| 2,401,344 | Espley | June 6, 1946 |
| 2,468,125 | Silver | Apr. 26, 1949 |
| 2,482,016 | McCoy | Sept. 13, 1949 |
| 2,500,725 | West | Mar. 14, 1950 |
| 2,531,609 | Bulgin | Nov. 28, 1950 |
| 2,536,991 | Wollan et al. | Jan. 2, 1951 |

FOREIGN PATENTS

| Number | Country | Date |
|---|---|---|
| 565,461 | Great Britain | Nov. 10, 1944 |